June 25, 1957   D. B. PECK   2,797,373
METALLIZED FILM CAPACITORS
Filed Aug. 28, 1952

INVENTOR.
DAVID B. PECK
BY

United States Patent Office 2,797,373
Patented June 25, 1957

2,797,373

METALLIZED FILM CAPACITORS

David B. Peck, Williamstown, Mass., assignor to Sprague Electric Company, North Adams, Mass., a corporation of Massachusetts Application August 28, 1952, Serial No. 306,835

4 Claims. (Cl. 317—258)

This invention relates to electrical capacitors, more particularly metallized film capacitors, and is in part a continuation of earlier application Serial No. 237,050, filed July 16, 1951, now Patent No. 2,740,732 and entitled "Electrical Condensers."

In the past the provision of a non-inductive terminal connection for a wound capacitor has been effected by winding the assembly so that the side edge of an electrode projects from the side of the winding, and a terminal lead is soldered or otherwise connected to as much as possible of the projecting side edge. With metallized film capacitors, however, the electrode is merely a metallized coating carried by a dielectric foil, so that the projecting side edges are of corresponding construction.

Although a metal foil crumples very readily and is very simple to make connections to, this is not the case where the metal is supported on a dielectric layer. The dielectric layer is more resilient and difficult to work with. Furthermore, this layer projects out at least as far as the metallized coating it carries and sometimes a little further so that the metal is not readily accessible. One cumbersome mechanism for providing an exposed edge of the metallized layer has been to actually fold over the edge of the dielectric, with the metallized surface outwards.

Among the objects of the present invention is the avoidance of the above and related disadvantages.

Further objects of the invention include the provision of a metallized film capacitor in which non-inductive connections with optimum current carrying capacity and minimum internal and terminating impedances, can be made with smaller projections.

Figure 1:
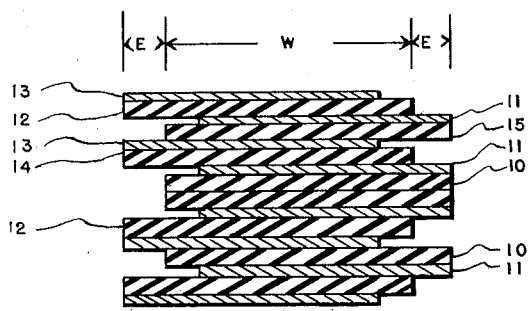
Figure 2:
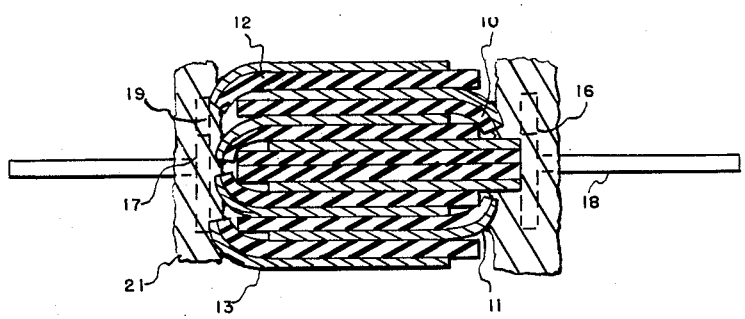

The above as well as still further advantages of the present invention will be more readily understood from the following description of several of its exemplifications, reference being made to the accompanying drawings wherein:

Figure 1 is a schematic sectional view of the essential elements of a metallized film capacitor according to the present invention, showing an early step in its preparation; and Figure 2 is a view similar to Figure 1 showing the same capacitor with terminal connections applied.

According to the present invention there is provided a capacitor having an elongated metallized dielectric stratum convolutely wound with another conductive stratum, said dielectric stratum being a shrinkable resin ribbon metallized on its outer face, the metallized side edge of said ribbon projecting about one-fiftieth of an inch beyond the side of the winding, and being shrunk after winding to fold inwardly and turn out the metallized surface of the projecting edges for better exposure. Lead structure is connected to the thus exposed metallized surface.

By shrinkable resin is meant any resin that upon suitable chemical or thermal treatment tends to contract from a ribbon having a predetermined length or width, to one having a smaller length or width. Resins which have been prepared as by extrusion and orientation, under conditions where they exhibit the so-called plastic memory are examples of this type of resin. Specifically, linear condensation polyesters of ethylene glycol and terephthalic acid that have been reduced to films by extrusion under orienting conditions are highly effective for the present invention. Polymers having molecular weights of about 5000 to 50,000 have been found particularly suitable. However, other resins, such as similar polyesters of terephthalic acid with propylene glycol or butylene glycol, or similar esters of other phthalic acids, particularly chlorinated terephthalic acid, are also suitable, along with polystyrene, cellulose acetate, polytrifluoromonochloroethylene, polytetrafluoroethylene and polyethylene. Also suitable are resins such as regenerated cellulose that have been swelled by the absorption of volatile materials like water and alcohol.

The metallized layers can be applied by metal spraying, evaporation, sputtering, etc., and can be of any desired metal, such as zinc, aluminum, lead, tin, or alloys of these with each other or with other metals. Where the resin is of the linear polyester type described above, it is preferable to use the metallizing technique set forth in the above-identified parent application, the details of which are hereby incorporated in the present application as though fully set forth herein.

In practicing the present invention, a pair of elongated metallized resin ribbons can be convolutely wound in offset relation in the standard manner of winding metallized film capacitors. However, the offset can be much less than heretofore used. Referring to Figure 1, two different metallized dielectric ribbons are there shown at 10, 12, each coated with a metallized film 11, 13, respectively. The width of the body of the winding, that is the distance from the recessed edge of one ribbon to the recessed edge of the other ribbon, is represented at w, and the side edge extensions at e, e. For the purposes of the present invention, these extensions e, e, need only be about a fiftieth of an inch, and can range by way of example from about a hundredth of an inch to about a thirty-second of an inch in width.

Each ribbon is disposed so that its metallized coating is on its outer face as wound, so that the winding has the general appearance shown in Figure 1.

After the winding is completed, the wound unit is subjected to conditions that cause the resin dielectric to shrink. This is very readily effected by heating the unit to a temperature below and within about 50 degrees of its melting point, that is, the range in which it spontaneously goes through its plastic memory deformation. This causes the ribbons 10, 12 to shrink in length or width. The main winding w of the unit thereby becomes more compacted. However, the extensions e, e which are more or less freely positioned as spaced turns, pull themselves in towards the axis of the winding and take the positions indicated in Figure 2. In this deformation, they bend so as to outwardly expose the metallized film that these projections carry, and the sidge edges of the films are accordingly highly accessible. In fact the side edges will now cover the resin edges so that it is almost impossible for the resin to interfere with any operation on the metallized edges. The shrinkage-inducing heating can be applied to the entire winding or only to the edges e.

After the shrinking operation is completed, terminals are conveniently connected as by soldering or spraying. By way of example a terminal 17 shown as having a spiral end 19, is placed with this end adjacent the exposed metallized edges of the coating 13 on foil 12. A layer of zinc, for example, as shown at 21, is then sprayed against the spiral end 19 in the conventional spraying manner to cause the terminal to adhere to the metallized layer on the edges e and to firmly fix the terminal in place. A corresponding terminal connection can also be applied to the other side as indicated at 18 in Figure 2.

Although only a few turns of ribbon convolutions are shown in Figures 1 and 2, any number of turns can be used as desired. Thus for capacitors having relatively large capacitances, such as 0.01 to 0.1 microfarad, fifty or sixty or more turns can be used. With capacitors of lower capacitances as little as twenty turns or less are sufficient.

The drawings also illustrate an uncoated margin 14, 15 on one side of each metallized ribbon. Such margins are advisable for use at the recessed edges of the foils in order to obtain adequate separation between the side edges of the recessed coatings and the projecting coatings of the opposite ribbons. However, the curling over of the present invention helps to interpose the projecting dielectric edges between the opposing coatings, so that the uncoated margin 15 can be somewhat smaller in width than was heretofore possible. Such spacing is, however, primarily useful in capacitors intended for operation at relatively high potentials such as 600 volts. For low voltage operation the margins 15 can be sharply reduced and even entirely eliminated.

For high voltage use it may also be desirable to convolutely wind the assembly with one or more additional unmetallized dielectric ribbons, such additional ribbons being laminated with each of the above metallized ribbons, in the desired number to provide the required resistance to voltage breakdown. It is preferred that these additional ribbons be only of width $w$, but they can also be extended to the width of a metallized ribbon ($w$ plus $e$).

Where the capacitor is intended to carry large currents, particularly in the form of rapid discharge pulses, it is also advisable to make the metallized coatings somewhat thicker at and adjacent to the extending portions $e$, as disclosed in the above-identified parent application.

The advantages of the present invention are obtainable even if only one terminal is non-inductively connected to the capacitor winding. In addition the non-inductive connection can be made to terminals having shapes different from that shown in Figure 2. By way of example the wound assembly can be merely inserted in a cylindrical can with the shrunk-over non-inductive projecting edge $e$ pressed into firm contact with the bottom of the can. If desired, the can bottom can also contain a layer of solder that can be melted while the wound unit is pressed in place, to thereby cause the metallized edge to be soldered to the can bottom against which it is held. Other forms of terminal connections are also suitable. In addition to the above the condenser, after the terminals are attached, can be impregnated with a dielectric impregnant such as a natural or synthetic mineral oil or chlorinated naphthalene or chlorinated diphenyl impregnants.

A feature of the present invention is that the reduction in the projecting widths required for making the non-inductive connections markedly increases the compactness of the unit. In other words capacitors of any standard capacitance and operating characteristics can be made to fit in smaller spaces in accordance with the present invention. The capacitors made as above can be enclosed in any convenient protective envelope. Thus for instance, a few outer turns of unmetallized resin, preferably of the shrinkable type, can be used to finish the winding of the unit, either by use of a separate unmetallized ribbon, or by having unmetallized extensions of the metallized ribbons. These outer turns can then be firmly compacted and sealed together during the shrinking operation or subsequently. A molding step can also be used to seal the outer turns together, or can be used to apply a separate external resin sheath as described for example in Patent No. 2,526,688, dated October 24, 1950.

Where the shrinkable resin is of the type that has been swelled by the absorption of a liquid, the shrinking is effected by evaporating off the absorbed liquid as by merely subjecting the wound unit to a reduced pressure for an extended period. This evaporation takes place most readily at the exposed edges of the winding and only a few hours is sufficient to provide the desired shrinkage where the absorbed liquid is water.

Frequently it may be desirable to extend the broad teaching of the present invention to cover constructions utilizing one or more floating electrodes. These electrodes can take the form of metallized areas upon resin strips, said strips and electrodes being positioned within a capacitance unit in such a manner so as not to project from either side of the unit, and so as not to connect to the terminals applied to these sides. Such floating electrodes can also be separate metallized layers placed in the center of lacquered coatings covering the metallized electrodes pictured in Figures 1 and 2 of the drawings. If desired, these floating electrodes can in themselves be covered with lacquer. In order to enable electrical contact to be made in such lacquered constructions the lacquer coating can extend only part way towards the edge of the original metallized area upon the resin base.

As many apparently widely different embodiments of this invention may be made without departing from the spirit and scope hereof, it is to be understood that the invention is not limited to the specific embodiments hereof except as defined in the appended claims.

What is claimed is:

1. A capacitor having an elongated metallized dielectric stratum convolutely wound with another conductive stratum, said dielectric stratum being a shrinkable resin ribbon and being metallized on its outer face, the side edge of said ribbon projecting beyond the side of the winding, and being shrunk after winding to fold inwardly and turn out the metallized surface of the projecting edges for better exposure, and lead structure connected to the exposed metallized surface, the projecting side edge being from one one-hundredth to one thirty-second inch wide.

2. A capacitor having elongated metallized dielectric strata convolutely wound in laterally offset relation, said dielectric strata being shrinkable resin ribbons and being metallized on their outer faces, the offset being sufficient for the metallized side edge of each ribbon to project beyond the sides of the winding and being shrunk after winding to fold inwardly and turn out the metallized surfaces of the projecting edges for better exposure, and lead structure connected to the respective exposed metallized surfaces the metallizing extending to the side edges opposite those that project.

3. The process which comprises convolutely winding an elongated, metallized dielectric stratum with another conductive stratum, said dielectric stratum being a shrinkable resin ribbon having a metallized surface on its outer face which projects from one one-hundredth to one thirty-second of an inch beyond the side of said winding, shrinking the wound resin ribbon to cause its projecting side to fold inwardly and uniformly turn out said metallized surface for better exposure, and securing a terminal lead to said turned out side.

4. A capacitor having an elongated metallized dielectric stratum convolutely wound with another conductive stratum, said dielectric stratum being a shrinkable resin ribbon projecting beyond the side of the winding, and being shrunk after winding to fold inwardly and turn out the metallized surface of the projecting edges for better exposure, and lead structure connected to the exposed metallized surface, the projecting side edge being from one one-hundredth to one thirty-second inch wide, and the metallizing extending to the side edge of the ribbon opposite the one that projects.

References Cited in the file of this patent

UNITED STATES PATENTS

| 2,177,266 | Schupp | Oct. 24, 1939 |
| 2,470,045 | Nagy | May 10, 1949 |

FOREIGN PATENTS

| 480,713 | Great Britain | Feb. 28, 1938 |
| 563,084 | Great Britain | July 28, 1944 |
| 584,549 | Great Britain | Jan. 17, 1947 |